United States Patent
Viswanathan et al.

(10) Patent No.: US 8,732,451 B2
(45) Date of Patent: May 20, 2014

(54) PORTABLE SECURE COMPUTING NETWORK

(75) Inventors: Rajesh Viswanathan, Woodinville, WA (US); David J. Steeves, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 709 days.

(21) Appl. No.: 12/468,948

(22) Filed: May 20, 2009

(65) Prior Publication Data

US 2010/0299518 A1    Nov. 25, 2010

(51) Int. Cl.
*H04L 29/06* (2006.01)
*H04L 9/00* (2006.01)

(52) U.S. Cl.
USPC ........... 713/152; 713/153; 713/154; 713/155; 380/28; 380/262; 380/270; 380/44; 726/12; 726/2; 726/14

(58) Field of Classification Search
USPC ........ 726/2, 5, 11, 4, 6; 713/152, 153; 380/44
See application file for complete search history.

(56) References Cited

U.S. PATENT DOCUMENTS

| | | | |
|---|---|---|---|
| 6,178,505 | B1 | 1/2001 | Schneider et al. |
| 7,124,189 | B2 | 10/2006 | Summers et al. |
| 8,051,473 | B2 * | 11/2011 | Szucs ............................... 726/10 |
| 2002/0169847 | A1 * | 11/2002 | Luna et al. .................... 709/216 |
| 2006/0080545 | A1 * | 4/2006 | Bagley ........................... 713/183 |
| 2006/0282662 | A1 | 12/2006 | Whitcomb |
| 2007/0198432 | A1 | 8/2007 | Pitroda et al. |
| 2008/0039085 | A1 | 2/2008 | Phan-Anh |
| 2008/0046996 | A1 | 2/2008 | Smith et al. |
| 2008/0092181 | A1 * | 4/2008 | Britt ................................. 725/87 |
| 2008/0276098 | A1 | 11/2008 | Florencio et al. |

FOREIGN PATENT DOCUMENTS

| | | |
|---|---|---|
| CN | 1725227 A | 1/2006 |
| WO | 02093377 A1 | 11/2002 |
| WO | 2003093942 A3 | 11/2003 |
| WO | 2005065008 A2 | 7/2005 |
| WO | WO 2005065008 A2 * | 7/2005 |
| WO | 2006132597 A1 | 12/2006 |

OTHER PUBLICATIONS http://public.dhe.ibm.com/software/commerce/doc/mft/ssp/34/SSP_Planning_Installing_Book.pdf "Sterling Secure Proxy Planning and Installation Guide"—Jul. 2006, IBM.*

(Continued)

*Primary Examiner* — Krista Zele
*Assistant Examiner* — Randy Scott
(74) *Attorney, Agent, or Firm* — Bryan Webster; Andrew Sanders; Micky Minhas

(57) ABSTRACT

As provided herein, when using an untrusted network connection, a secure online environment can be created for a remote machine by connecting to a trusted computer with a trusted network connection. A proxy server is installed on a first computing device and shared encryption keys are generated for the first device and a portable storage device. A connection is initiated between a second computing device (e.g., remote device), connected to an untrusted network, and the first computing device, comprising initiating a proxy server protocol from the portable storage device (e.g., attached to the second device), using the second computing device. A secure connection between the first and second devices is created using the encryption keys.

20 Claims, 8 Drawing Sheets

(56) References Cited

OTHER PUBLICATIONS http://citeseerx.ist.psu.edu/viewdoc/download?doi=10.1.1.45.7333&rep=rep1&type=pdf "Proxy-Based Authorization and Accounting for Distributed Systems"—Neuman et al, PSU, 1993.*

"eToken", Windows 2000, http://etoken.mikrobeta.com.tr/PDF/DS_Windows%202000_SmartCard_Network_Logon.pdf.

International Search Report in PCT Application No. PCT/US2010/034436 dated Dec. 1, 2010.

Chinese Search Report in Chinese Application No. 201080021894.2 dated Jan. 27, 2014, 2 pgs.

* cited by examiner

PORTABLE SECURE COMPUTING NETWORK

BACKGROUND

People traveling away from their home often desire to utilize computer-related services while away from home (e.g., using a laptop computer or other computer-related device). For example, travelers may utilize an accompanying laptop computer that can provide access to applications and typically allows them to connect to a network or the Internet. It is not unusual to see a coffee shop with several patrons accessing the shop's wireless access point (WAP) to connect to a network or the Internet. Further, some locations provide computers for use by travelers or patrons, such as an airport computer kiosks or Internet cafes, where a user can utilize a computer to access a network or the Internet. Inherently, when one utilizes a foreign (e.g., not at home or a trusted site) WAP or terminal to access the Internet they are connecting through an untrusted network (e.g., not a trusted network set up and controlled by the user).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Data that is sent and received over an untrusted network, such as a public access point in a hotel or airport, can be sniffed (e.g., detected and intercepted) by malicious users (e.g., hackers, identity thieves). Further, malicious techniques, such as wardriving (e.g., driving around searching for wireless access points (WAPs) using a computing device) can be used to sniff and steal data over an insecure network.

Typically, individuals that access the Internet or send information from their home computers (or some other trusted device) use secure networks that they trust (e.g., have set up a prior trusted relationship with). However, users often travel away from their trusted computers (e.g., or set of trusted computers, such as home, work, etc.) and wish to access online services while away. For example, while at an airport a business traveler may wish to access their email from the company's enterprise network email server. However, in this example, using a public kiosk computer (e.g., or public wireless access point (WAP) to access their email presents a situation where potentially sensitive data may be sent over an untrusted network.

Current and prior solutions to creating a secure online network connection using an untrusted network connection include virtual privacy networks (VPNs). However, VPNs typically require one to install a VPN client on the machine that will be used to connect to the VPN, such as a laptop used to connect to a corporate VPN. Further, VPNs typically comprise one or more remote computers connecting (through the VPN) to a single network point for accessing data or online activities.

Techniques and systems are disclosed herein that allow an individual to create an ad hoc VPN, for example, using a portable storage device. For example, a user may be able to set up a secure connection between a computing device (e.g., laptop, computer terminal, smart phone/device, etc.) that they take with them (e.g., remotely) and a trusted computing device (e.g., a home or work PC) that utilizes a trusted connection to a network. In this way, for example, a VPN client does not need to be installed on the remote machine, and the user may connect to one of a plurality of trusted computers set up by the user.

In one embodiment, a secure online environment can be created for a computing device connected to an untrusted network, by connecting to a trusted computing device connected to a trusted network. A proxy server can be installed on a first computing device (e.g., a home PC), from a set of trusted computing devices that use one or more trusted networks (e.g., secure connections with trusted ISPs) for online access. Further, one or more encryption keys, such as asymmetric or symmetric keys, can be generated for the first computing device and a portable storage device. When a user is away from their trusted computing devices, for example, contact with the first computing device can be initiated from a second computing device (e.g., laptop connected to a wireless access point (WAP)) that accesses an untrusted network (WAP), where a proxy server protocol is initiated from the portable storage device, using the second computing device, over the untrusted network. Additionally, a secure connection can be created between the second computing device and the first computing device using the shared encryption keys, such as by using symmetric keys to exchange data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
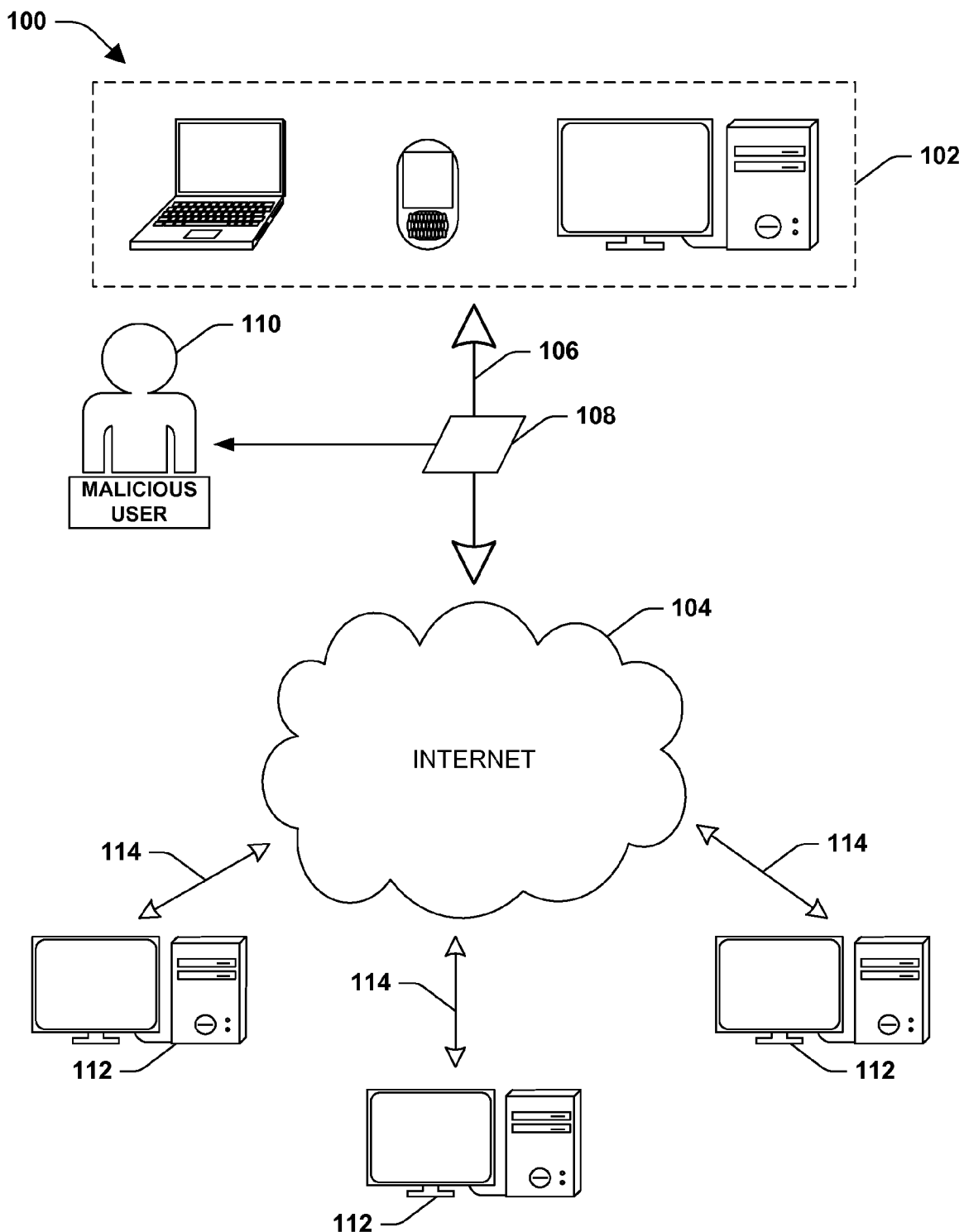
FIG. 1 is an illustration of an exemplary environment where a remote device may be connect to the Internet over an untrusted network, and trusted devices connect using trusted connections.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides data security to a user who may be attempting to send or receive data over an untrusted network. Where a user has one or more trusted computers connected to one or more trusted networks, in locations remote from the user's current location (e.g., the user is in a first location and the trusted computers are in a second location), a trusted computer can be utilized to provide data security, for example, when the user is attempting access the Internet over the untrusted network.

As an example, in FIG. 1 illustrates an exemplary environment 100 where a remote device 102, such as a user's laptop at a coffee shop, a smart phone at a hotel, and a computer terminal at an airport kiosk, may be connected to the Internet 104 over an untrusted network 106. In this example, an untrusted network may be one that has not been set up by the user of the device 102. Untrusted networks, such as a wireless access point in a public location, may be subject to malicious users 110 sniffing and retrieving data 108 sent over the network 106, either to or from the device 102 connected to the untrusted network 106.

In one embodiment, the device itself may also be an untrusted device, such as a public terminal accessing a public network (e.g., at an airport kiosk, public library, hotel business lounge, or Internet café), for example. In this embodiment, a malicious user 110 may be able to monitor activities of a user of the device 102, and/or attempt to retrieve data 108 sent over the untrusted network 106.

Figure 2:
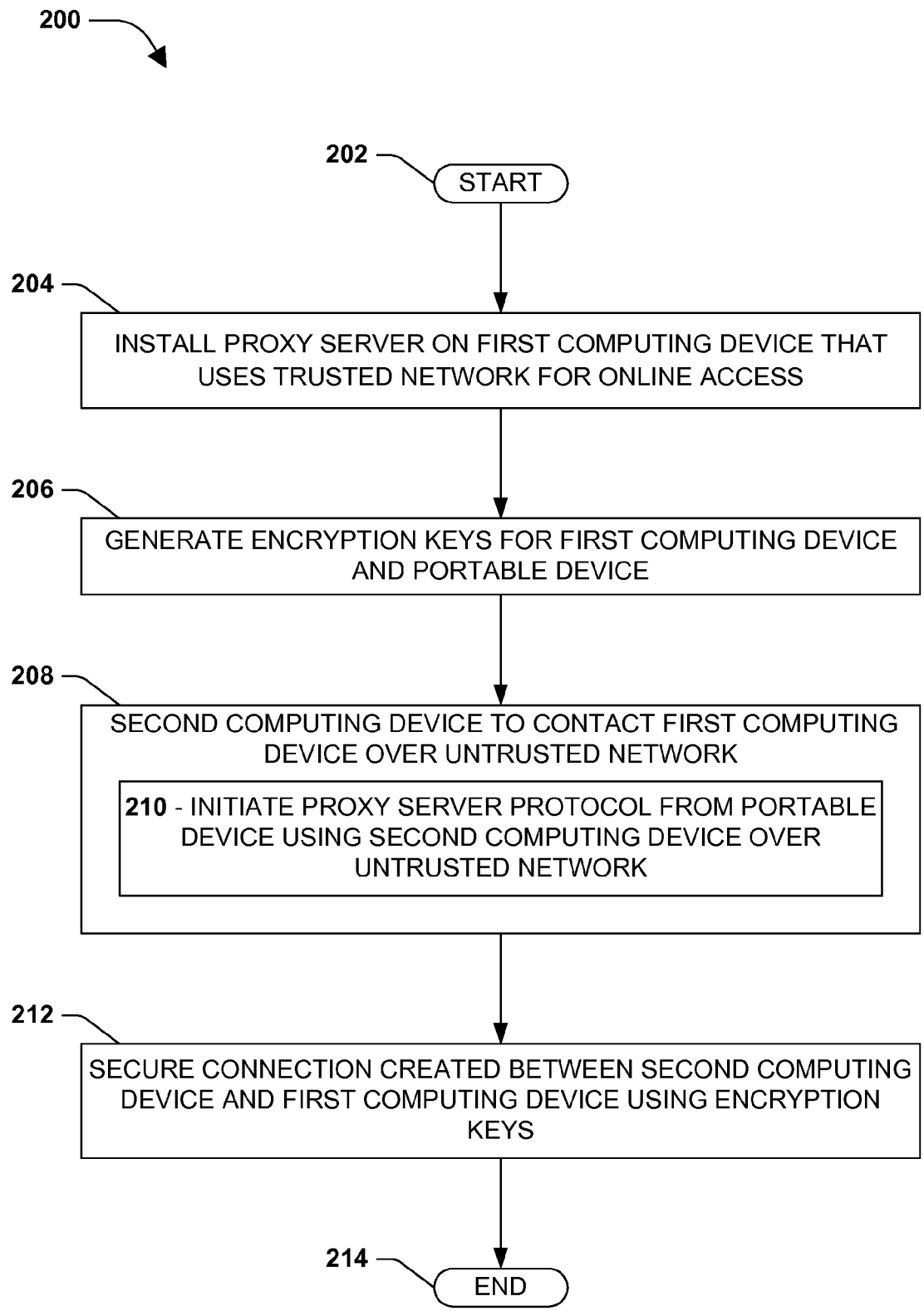
FIG. 2 is a flow chart diagram of an exemplary method for creating a secure online environment for a computing device connected to an untrusted network using a trusted computing device connected to a trusted network.

FIG. 2 is a flow chart diagram of an exemplary method 200 for creating a secure online environment for a computing device connected to an untrusted network using a trusted computing device connected to a trusted network. The exemplary method 200 begins at 202 and involves installing a proxy server on a first computing device, which is from a set of trusted computing devices connected to one or more trusted networks for online access, such as Internet access, or enterprise email retrieval, at 204.

In one embodiment, setting up the proxy server on a trusted device may allow the trusted device to act as a go between for data requests sent from a connected client, such as requests for information from the Internet. For example, in FIG. 1, a user may employ a set of trusted devices 112 that are connected to the Internet 104 over trusted network connections 114. In this example, a proxy server can be set up on one or more of the trusted devices 112, such that they can act as go betweens for a client (e.g., a device 102) wishing to connect to the Internet 104.

At 206, shared encryption keys can be generated for the first computing device and a portable storage device. Where encryption keys allow connected computing devices to communicate using encrypted data, for example, these shared keys can be generated and stored in a trusted computer connected to a trusted network (e.g., the first computing device) and a portable storage device (e.g., a USB flash drive, SIM card, or SD flash memory card) by connecting the storage device to the trusted computer.

In one embodiment, the shared encryption keys may comprise public keys from an asymmetric encryption key pair, where a public-private key pair is generated for the first computing device, for example, or from the portable storage device. In this embodiment, the private key can be stored on the first computing device, and the public key can be written to (stored on) the portable storage device (shared). In another embodiment, the encryption keys may comprise symmetric encryption keys, where the keys (e.g., encryption and decryption keys) may represent a shared secret between the first computing device and the portable storage device used to encrypt and decrypt data. In one embodiment, using shared encryption keys may allow a shared one-time password (e.g., a nonce) to be created, where the shared one-time password can be a shared secret between connected devices to create a secure environment.

At 208, in the exemplary method 200, a second computing device, which accesses an untrusted network, contacts the first computing device. Contacting the first computing device comprises initiating a proxy server protocol from the portable storage device using the second computing device, over the untrusted network, at 210. For example, a user may take their wireless enabled laptop to a wireless hotspot (e.g., location that provides access to a public wireless network for online access), wishing to connect to the Internet over using a wireless access point (WAP) at the hotspot.

In one embodiment, the user may connect the portable storage device to their laptop, for example. In this embodiment, the portable storage device can initiate the proxy server protocol, allowing the laptop to connect the first computing device, such as their home PC, which can act as a proxy server for the laptop to communicate online. In one embodiment, initiating the proxy server protocol may allow the laptop, for example, to connect to their home PC using secure hyper-text transfer protocol (HTTPS). In another embodiment, the proxy server protocol may utilize IPSec, such as for a secure enterprise connection, or IPV6, such as where the second computing device may be a smart phone.

I will be appreciated that proxying between devices is not limited to any particular protocol, thereby allowing different networks to be utilized. For example, while HTTPS may not be ideal for efficiency reasons, most firewalls allow use of this protocol for proxying data. Therefore, it can be used effectively for secure connectivity. However, the techniques and systems, described herein, are not limited any particular protocol for proxying, and those skilled in the art may devise alternate protocols for this purpose.

It will be further appreciated that, while the embodiments described above describe using the second computing device to contact the first computing device in a client-server relationship, the techniques described herein are not limited to these embodiments. It is anticipated that those skilled in the art may devise alternate techniques for the proxying relationship. For example, a plurality of devices (e.g., home PC, work PC, personal laptop, etc.) may be utilized as trusted proxy machines to create a kind of trusted group of machines. In one embodiment, any device in the group may use any other device in the group as a proxy, for example, allowing many devices to connect through any one or more of many other devices.

At 212, a secure connection (e.g., a secure tunnel) can be created between the second computing device and the first computing device using the shared encryption keys. In one embodiment, an encryption key exchange can take place between the first computing device and the portable storage device. For example, because the portable storage device and the first computing device have already setup a trust relationship, such as in described 206 above, exchanging the keys can result in creation of a secure tunnel between the first and second computing devices. In this embodiment, exchanging keys can allow data transferred between the devices to be encrypted, thereby mitigating a potential malicious user from utilizing data they may have stolen from the untrusted network, for example. In another embodiment, exchanging the keys may allow for a onetime password (e.g., a nonce) to be created that can be used as a shared secret between the trusted devices, thereby creating a secure connection.

Having created a secure connection between the second computing device and the first computing device, the exemplary method ends at 214.

Figure 3:
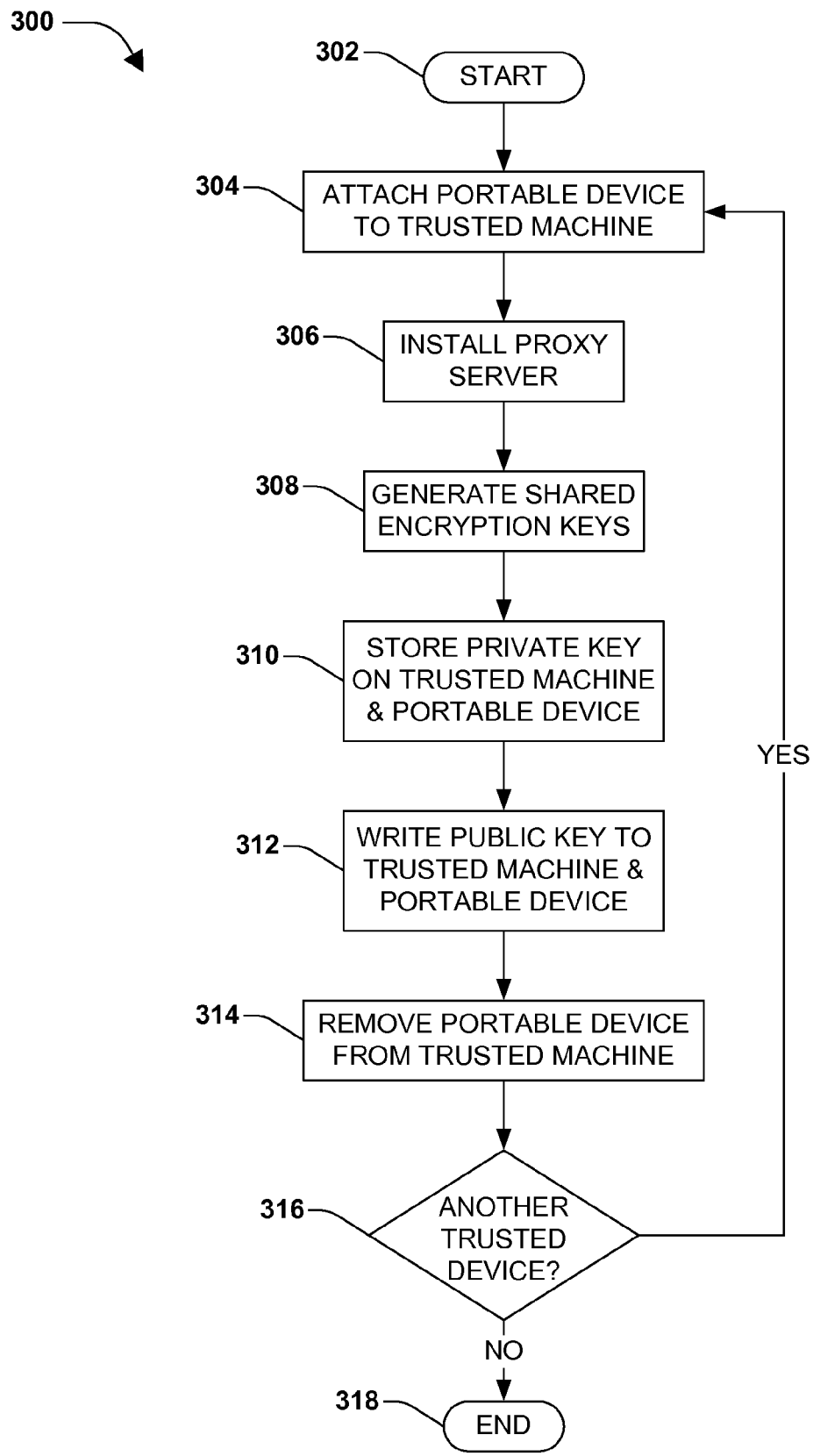
FIG. 3 is a flow chart diagram illustrating one embodiment of a portion of a method, where a trusted machine may be set up to be used for creating a secure online environment for a remote user.

FIG. 3 is a flow chart diagram illustrating one embodiment 300 of a portion of a method, where a trusted machine may be set up to be used for creating a secure online environment for a remote user. The exemplary embodiment 300 of the method begins at 302 and involves attaching a portable storage device to a trusted machine, which is connected to a trusted network, at 304. For example, individuals may utilize one or more trusted machines for online access (e.g., Internet access), such as their home PC, a work PC, and/or another machine located at a trusted location. Typically, these trusted machines are connected to trusted networks, such as those that have security to mitigate malicious users from stealing data, and/or may have been set up by the user.

At 306, a proxy server can be installed on the trusted machine from the portable storage device. In this embodiment, the portable storage device may be a USB flash drive, for example, that comprises the applications and data needed to set up trusted devices for use as secure proxies. The trusted device can be set up as a proxy server to act as a go between for a second device (e.g., laptop, mobile phone, etc.) using an untrusted network and the Internet, for example.

At 308, encryption keys can be generated for the trusted device and the portable storage device. Typically, in order to provide for encryption of data transferred between devices one or more shared encryption keys are generated and installed on the respective devices. In this embodiment, public and private asymmetric encryption keys can be generated, where respective devices store a private key, at 310, and a corresponding (paired) public key is stored (shared) on the other device, at 312.

For example, an encryption key pair is generated for the trusted device; the private key is stored in the trusted device and the public key is written to the portable storage device. Further, in this example, an encryption key pair is generated for the portable storage device; the private key is stored on the portable storage device, and the public key is written to the trusted device. This allows respective devices to send encrypted data to each other using the public key, and have the data decrypted by the receiving device using the corresponding private key. In this way, merely those that have the private key can decrypt data sent over the untrusted network, thereby mitigating malicious users from using stolen data.

At 314, in this embodiment 300, after the proxy server has been installed and encryption keys generated, the trusted machine is set up to act as a secure proxy, so the portable storage device can be uncoupled from the trusted machine. Often, an individual may have more than one computer that they trust, such as a work and home computer, and computers located in other trusted locations. In this embodiment, at 316, if a user has another trusted device the portable storage device can be coupled with that trusted machine, at 304, to set it up as a secure proxy machine, for example. Otherwise, if the user has no more trusted computing devices available, the exemplary embodiment 300 of the method ends at 318.

Figure 4:
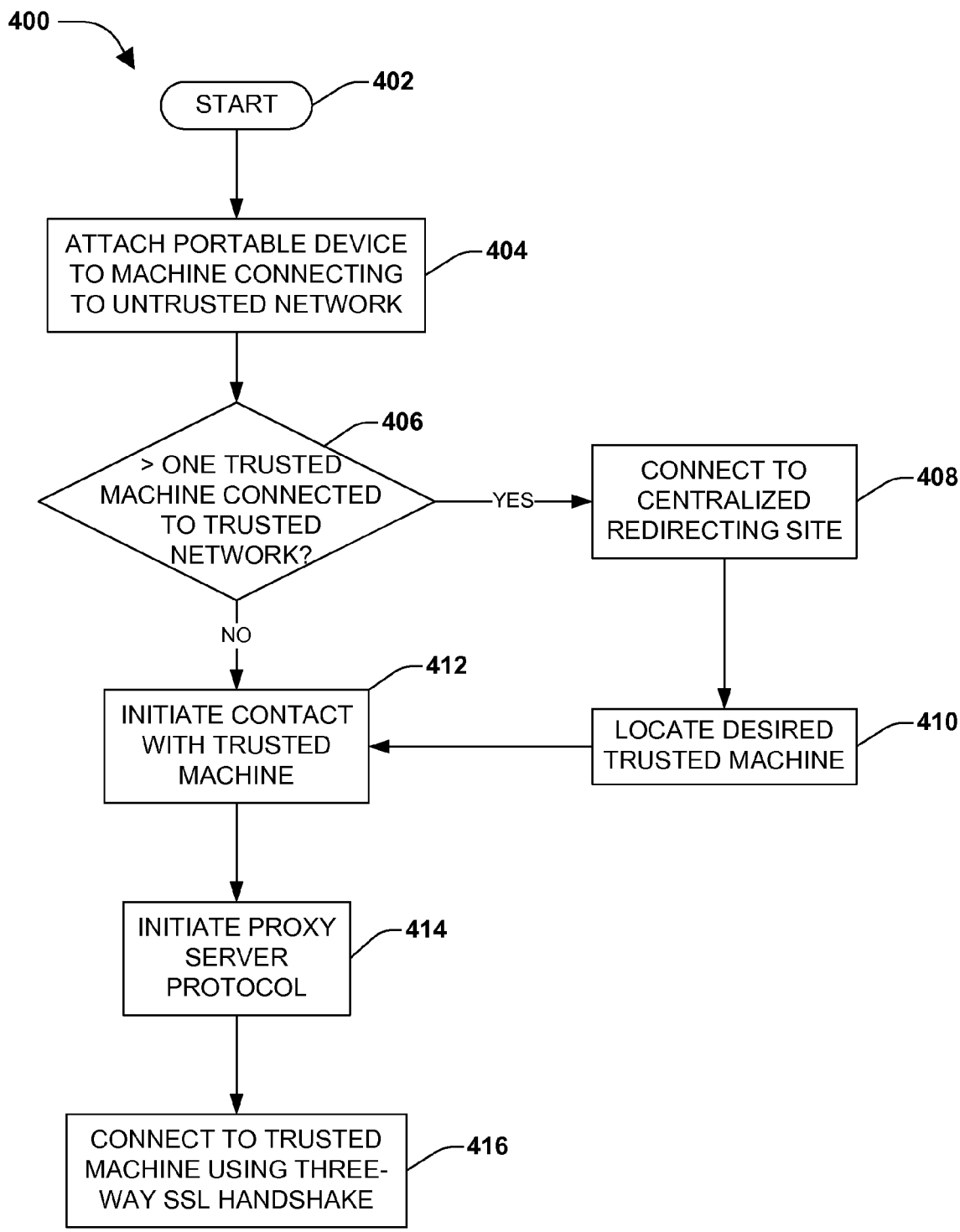
FIG. 4 is a flow chart diagram of an exemplary embodiment of a portion of a method, whereby a user can create a secure connection from a remote location.

FIG. 4 is a flow chart diagram of an exemplary embodiment 400 of a portion of a method, whereby a user can create a secure connection from a remote location. The exemplary embodiment 400 of the portion of the method begins at 402 and involves connecting the portable storage device to a remote computing device that the user is utilizing to connect to an untrusted network.

For example, as illustrated in FIG. 1, the user may wish to use a computing device 102 to remotely (e.g., while away from a trusted computer or trusted network) connect to the Internet 104 over an untrusted network 106, such as using a wirelessly enabled laptop or smart phone/device at a public WAP, or a public computer. In this embodiment, for example, the user may plug a USB flash memory drive into the laptop or public computer, or a SIM card or SD card into the smart phone/device.

At 406, if the user has set up more than one trusted machine to act as a proxy server, such as in FIG. 3, 300, they may choose to connect to a centralized redirecting site, at 408. In one embodiment, the centralized redirecting site may be an Internet-based web-site that users can associate a group of "trusted" machines with, for example, by registering the machine locations and other specifications, such as IP addresses. In another embodiment, the centralized redirecting site may be an application running on a network that a user can connect to online, which comprises information about a user's group of trusted machines. As an example, in FIG. 1, 100, a user may have set up a plurality of trusted computers 112 that utilize trusted networks 114 to connect to the Internet.

At 410, the centralized redirecting site can locate a desired trusted machine, for example, from a set of trusted computing devices that were previously setup by the user to be proxy servers. In one embodiment, a "desired" machine may comprise one that has a desired (e.g., fastest) connection speed to the remote machine that the user is using to connect to the centralized redirecting site. Further, a "desired" machine may comprise one that is "closest" in proximity (e.g., geographically, or by number of hops between nodes in a connection network) to the remote machine. Additionally, the "desired" machine may comprise one that has particular programs, files, security protocols, or some combination of these elements, connection speed and proximity. In one embodiment, the user may be able to preselect preferences for locating "desired" machines, and/or may select them on-the-fly upon connection to the centralized redirecting site.

At 414, contact with the trusted computing device, which is connected to a trusted network, is initiated. In one embodiment, if the user has merely one trusted machine set up as a proxy server, at 406, or they choose a particular machine, for example, the contact may be initiated with that machine, over the untrusted network. In another embodiment, a connection from the remote machine to the desired trusted machine is redirected from the centralized redirecting site to the trusted machine, over the untrusted network.

The proxy server protocol is initiated from the portable storage device, which is connected to the remote machine of the user, at 414. In this way, in one embodiment, traffic between the remote machine connected to the trusted machine over the untrusted network can be filtered according to the proxy server protocol. In this embodiment 300, at 416, a secure connection is established between the remote machine and the trusted machine over the untrusted network, using a three-way secure socket layer (SSL) (e.g., often called transport layer security (TLS) handshake.

For example, the portable storage device and the trusted machine already have a trust relationship established when the trusted machine was set up to be a proxy server, such as in FIG. 3, 300. The portable device attached to the remote machine can initiate the proxy server protocol, which corresponds to the proxy server set up on the trusted machine, using the remote machine. In this way, a handshake can occur between the portable device, remote machine, and trusted machine using the proxy server protocol to establish a connection.

In one embodiment, when a request is made by the remote machine over the untrusted network, such as sending data to a website, the request can be encrypted using the shared encryption key on the portable device and sent to the trusted machine over the untrusted network. Because the trusted machine shares the encryption key, it can decrypt the request, thereby creating a secure connection between the remote and trusted machine over an untrusted network.

In one aspect, a first computing device that is set up as a proxy server for a second computing device can be used to proxy data traffic to and from online services and sites (e.g., the Internet), for example. In this way, data traffic for the second computing device that is connected to an untrusted network can be proxied through the first computing device that is connected to a trusted network.

In one embodiment, in this aspect, outbound data traffic from the second computing device can be encrypted and sent over the untrusted network, where is it is proxied through the first computing device, decrypted, and sent to the trusted network. Further, inbound data traffic for the second computing device from the trusted network can be proxied through the first computing device, encrypted, and sent to the second computing device over the untrusted network. In this way, for example, data that may be sent to and from the Internet (e.g., such as a transaction on a merchant website) is encrypted when sent over the untrusted network.

In one embodiment, proxying data traffic can comprise routing data traffic by proxying an application layer protocol from an Internet protocol suite (TCP/IP). In TCP/IP, an application layer comprises methods and protocols for process-to-process communications using an internet protocol (IP) network to establish connections between machines. In one example, the proxy server can route traffic, as appropriate, by proxying at a hyper-text transfer protocol (HTTP) layer for the application layer.

In another embodiment, proxying data traffic can comprise routing data traffic by proxying a transport layer protocol from the Internet protocol suite (TCP/IP). The transport layer is responsible for encapsulating application data, such as from the application layer, into data packets for transport to a network structure that may then transmit them to a destination host machine. In one example, the proxy server can route traffic, as appropriate, by proxying at a transmission control protocol (TCP) layer for the transport layer.

In another embodiment, the portable storage device (e.g., a USB flash-drive) may be set up to make itself appear as a network connection to the second computing device (e.g., laptop used at a wireless hotspot). In this embodiment, the second computing device, for example, may not need a client device to connect to the network, it can use the network connection from the portable storage device. As another example, one or more applications, which have been setup to recognize the proxying relationship between the devices, may communicate directly with the portable storage device, knowing that is a proxied network.

Figure 5:
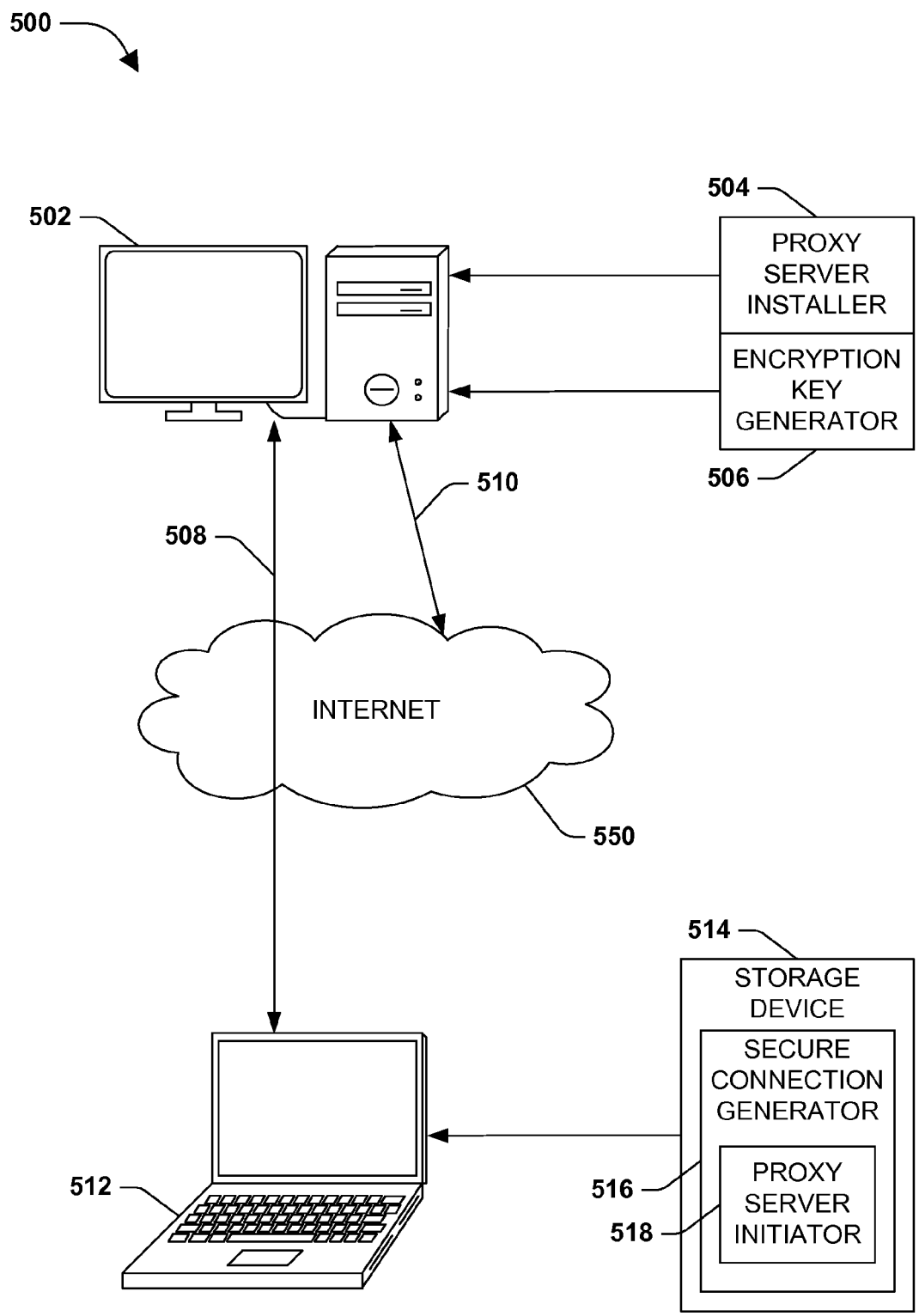
FIG. 5 is a component block diagram of an exemplary system for creating a secure online environment for a computing device connected to an untrusted network using a trusted computing device connected to a trusted network.

A system may be devised that allows a user to securely interact with an online environment, such as the Internet or an enterprise network, while connected to an untrusted network, such as a public wireless access point (WAP), or a public computer terminal (e.g., at an airport kiosk). FIG. 5 is a component block diagram of an exemplary system 500 for creating a secure online environment for a computing device connected to an untrusted network using a trusted computing device connected to a trusted network.

The exemplary system 500 comprises a proxy server installer 504 that is configured to install a proxy server on a first computing device 502. The first computing device 502 is from a set of trusted computing devices that use one or more trusted networks for network access. In one embodiment, the set of trusted computing devices can comprise one or more computers that are trusted by the user, for example, being set up and/or maintain by a trusted source so that malicious attacks are mitigated. Further, the set of trusted computers connect to a network that is also trusted by the user, where security for mitigating malicious attacks is maintained, for example.

The exemplary system 500 further comprises an encryption key generator 506 that is configured to generate one or more shared encryption keys for the first computing device 502 and a portable storage device 514. For example, the encryption key generator 506 can generate a shared encryption key that may be stored on a user's trusted computer and a USB flash drive, so that data traffic between the trusted computer and the flash drive can be encrypted and decrypted by the respective devices.

One embodiment of a shared encryption key may include a public and private asymmetric key pair, where a public-private key pair is generated for respective devices, such as the trusted computer and the flash drive, and a public key is shared with the respective other device (e.g., the flash drive gets the trusted computer's public key and vice-versa). Another embodiment of a shared encryption key may include a symmetric key. A symmetric key is written to both devices, for example, such as to the trusted computer and flash drive. Data traffic is encrypted and decrypted using the symmetric key, for example, where a onetime password (e.g., nonce) is generated as a shared secret, to allow for a secure trust relationship to be established between devices.

The exemplary system 500 further comprises a secure connection generator 516 disposed on the portable storage device 514. The secure connection generator 516 is configured to initiate contact with the first computing device 502 from a second computing device 512 over an untrusted network 508 using a proxy server protocol. The secure connection generator 516 comprises a proxy server initiator 518 that is configured to initiate a proxy server protocol from the portable storage device 514 using the connected second computing device 512, where the second computing device accesses the untrusted network 508.

In this way, in one embodiment, the portable storage device 514 can be attached to the second computing device 512, and the proxy server initiator 518 can initiate the proxy server protocol after the secure connection generator 516 has contacted the first computing device 502 over the untrusted network 508. As an example, the untrusted network 508 may comprise a public wireless access point (WAP) that connects to the Internet 550. In this example, the secure connection generator 516 can use the second computing device 512 to connect to the first computing device 502 over the Internet 550, using the untrusted network 508.

The secure connection generator 516 is further configured to create a secure connection between the second computing device 512 and the first computing device 502 using the encryption keys over the untrusted network 508. In one embodiment, the secure connection generator 516 can initiate an SSL three-way handshake with between the second computing device 512 and the first computing device 502 (and the storage device 514) using the proxy server protocol initiated by the proxy server initiator 518.

As an example, because the portable storage device 514 and first computing device 502 have shared encryption keys, comprising a pre-existing trust relationship, a secure connection can be established by encrypting data traffic between the connected computers 502 and 512 over the untrusted network 508. In this way, in one embodiment, the new created secure connection between the second computing device 512 and the first computing device 502 can be used to proxy data traffic, such as Internet requests, for the second computing device that is using the untrusted network 508 through the first computing device 502 that is using the trusted network 510. In this embodiment, for example, Internet data requests can be transported to and from the Internet 550 over the trusted network 510, to the trusted machine 502, and be transported to and from the second computer 512 in an encrypted form.

In another embodiment, the storage device 514 may comprise a wireless communications component (e.g., a wireless antenna), for example, for communicating over a wireless network. In this embodiment, the second computing device 512 can utilize the storage device 514 as a network adaptor. In this way, for example, the storage device 514 can proxy data traffic for the secure connection through the trusted network 510.

Figure 6:
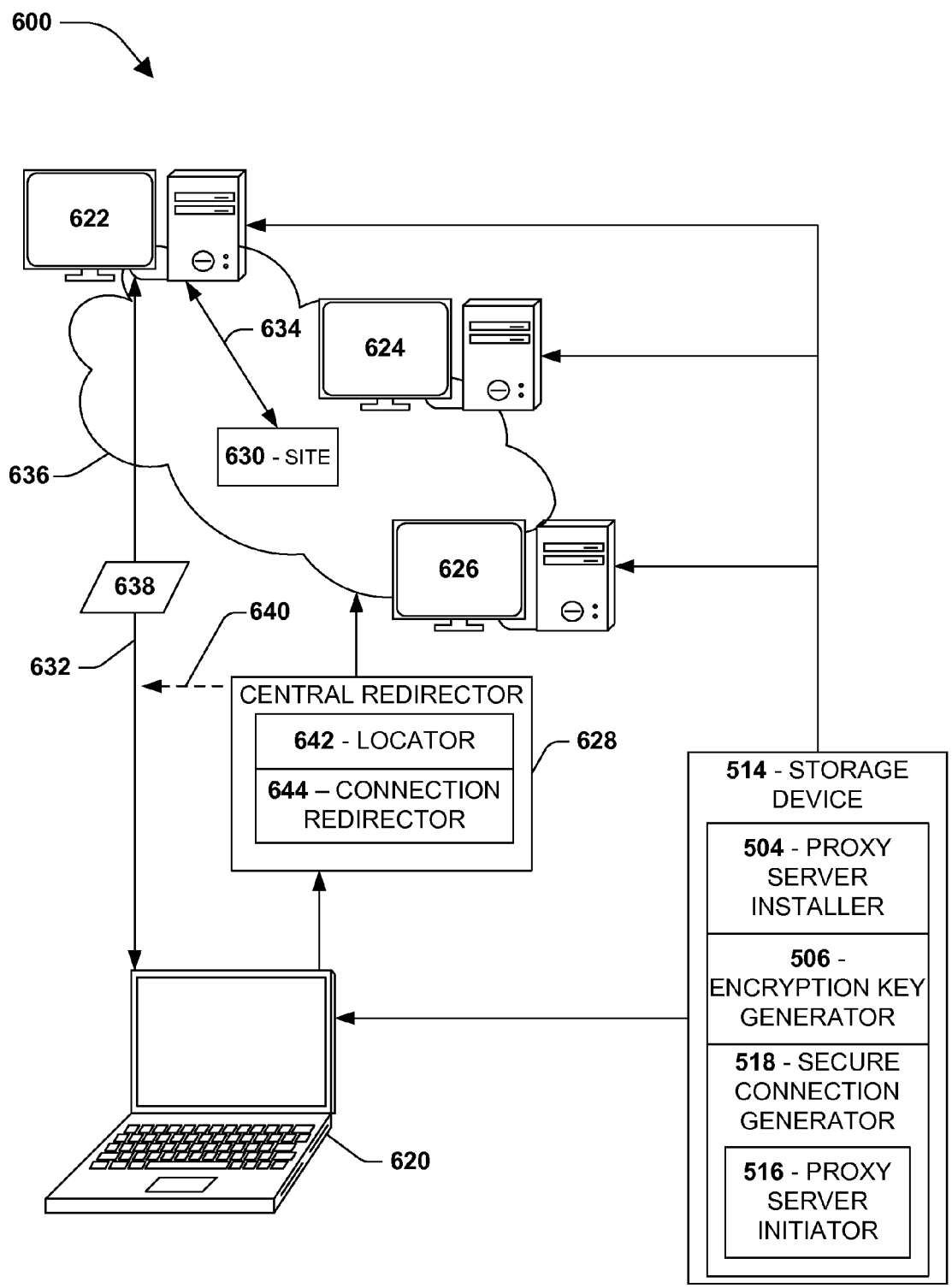
FIG. 6 is one embodiment of an exemplary system for creating a secure connection between a computing device connected to an untrusted network using a trusted computing device connected to a trusted network.

FIG. 6 is one embodiment 600 of an exemplary system for creating a secure connection between a computing device connected to an untrusted network using a trusted computing device connected to a trusted network. In this embodiment 600, the portable storage device 514 comprises the proxy server installer 504, encryption key generator 506, and secure connection generator 516, which in turn comprises the proxy server initiator, as described above.

In this way, for example, the portable storage device can be attached to respective computers 622, 624, and 626 (e.g., the first computing device) in a set of computing devices trusted by the user, and using trusted connections to connect to a network, such as the Internet 636, and used to install a proxy server on the computers 622, 624, and 626. Further, while attached, encryption key pairs can be generated for the respective computers 622, 624, and 626 and shared with the portable storage device 514 (and vice-versa).

In the exemplary embodiment 600, a user may take the portable storage device 514 with them when traveling away from their set of trusted computers 622, 624, and 626. When the user wishes to access online services in a public location (e.g., using a laptop in at a WAP, or a public computer terminal at an Internet café), they can attach the portable storage device 514 to the second machine 620 that is accessing a network over an untrusted connection 632 (e.g., accessing the Internet over a WAP) to create a secure connection between the second machine 620 and one of the trusted computers 622, 624, and 626.

In this embodiment 600, the exemplary system comprises an online centralized redirector 628, which is configured to facilitate connecting the second computing device 620 to a desired trusted computing device 622. One example of an online centralized redirector 628 may be a website that is configured set up to help redirect the connection to a trusted computer. Another example may include an application running on a network that facilitates the connection redirection. It will be appreciated that the system described herein is not limited to these embodiments, and it is anticipated that those skilled in the art may devise alternate centralized redirection components and techniques.

The online centralized redirector 628 comprises a locator 642 configured to locate a desired trusted computing device 622 from the set of trusted computing devices 622, 624, and 626. For example, a desired device 622 may comprise one that has a desired connection speed and/or proximity to the second computing device 620. In this way, in this example, the locator can select a trusted device 622 from the set 622, 624, and 626 based on a user's pre-arranged preferences or default preferences set up by the centralized redirector 628.

The online centralized redirector 628 further comprises a connection redirector 644 configured to redirect 640 a connection 632 from the second computing device 620 to the desired trusted computing device 622. In this embodiment, for example, the second computer 620 connects to the centralized redirector 628; and the connection redirector 644 redirects that connection to a desired trusted computer 622 that was identified by the locator 642. In this way, a connection can be made 632 between the second computer 620 and the trusted computer 622 over the Internet 636, for example.

Additionally, in this embodiment 600 of an exemplary system, the second computer 620 may wish to send a request to a website 630, for example, in order to purchase an item online. The request can be encrypted at the second computer 620 using the encryption key on the storage device 514 plugged into the computer 620. The request 638 can be sent over the untrusted connection 632 to the trusted computer 622 (e.g., over the Internet 636) as encrypted data, thereby mitigating a potential malicious user using the data if stolen. The trusted computer 622 can decrypt the request using the shared encryption key and forward it to the site 630 over the trusted network connection 634.

Figure 7:
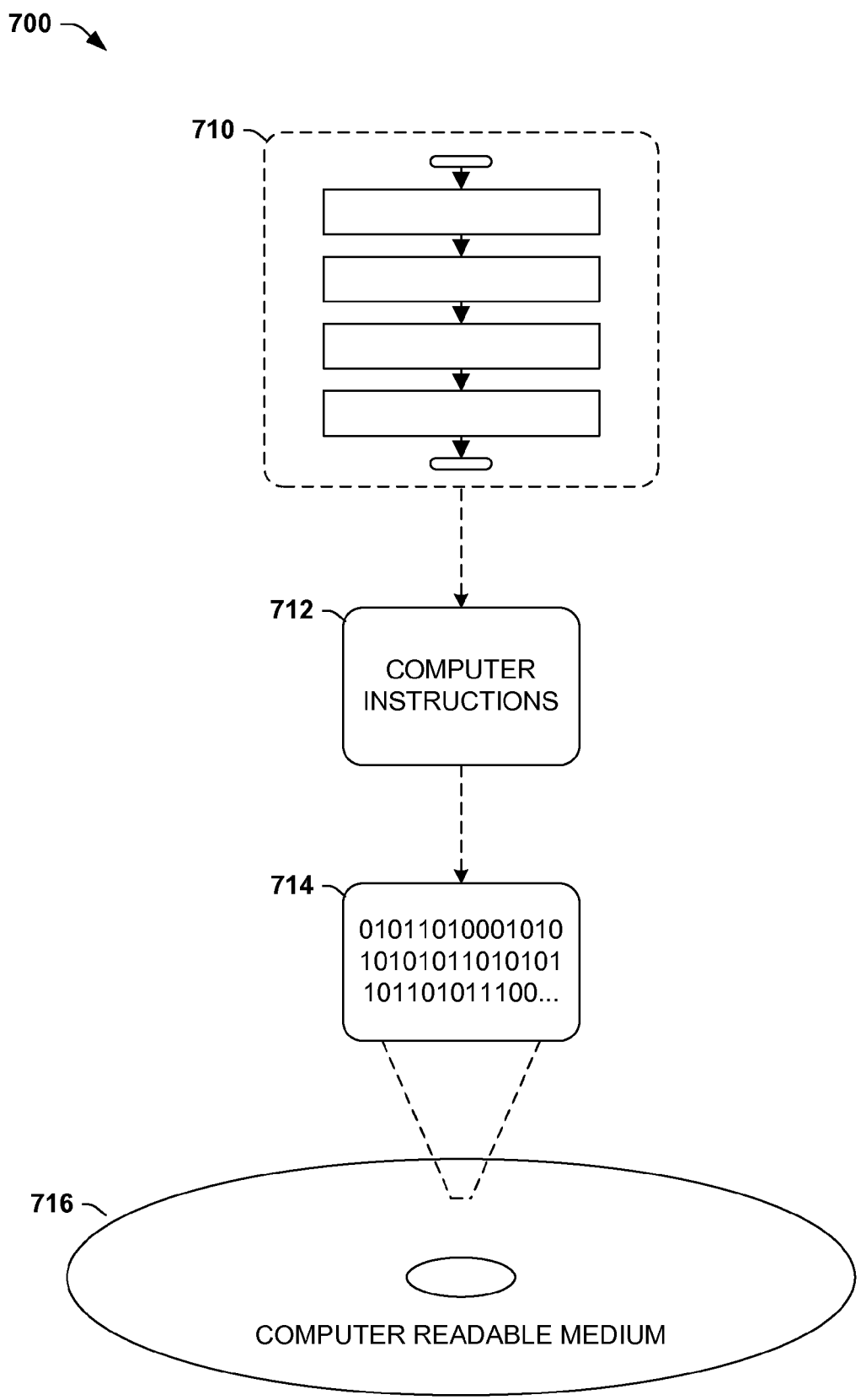
FIG. 7 is an illustration of an exemplary computer-readable medium comprising processor-executable instructions configured to embody one or more of the provisions set forth herein

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 200 of FIG. 2, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
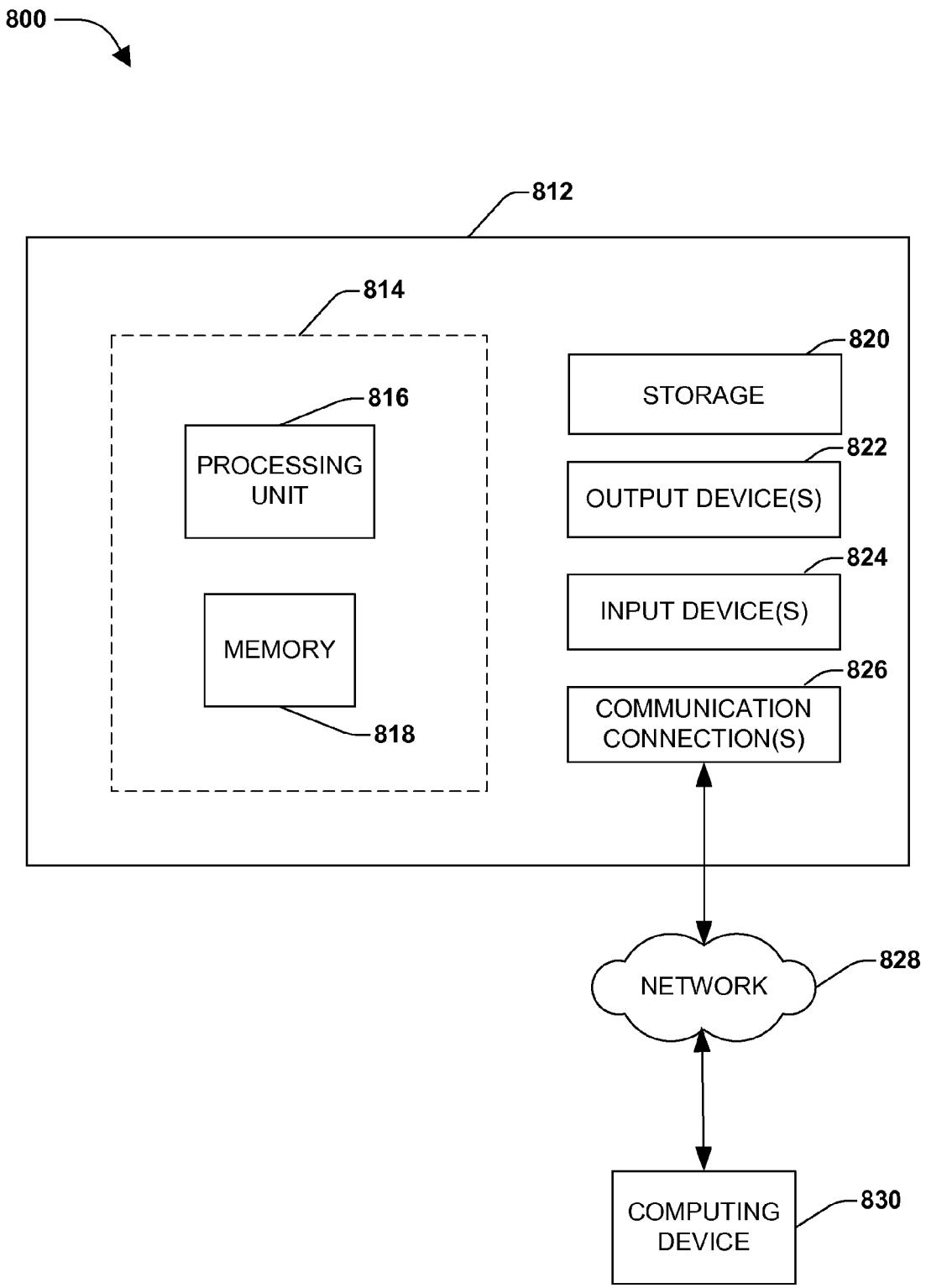
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for creating a secure online environment for an unsecured computing device connected to an untrusted network using a first trusted computing device connected to a trusted network, comprising:
    installing, using a portable storage device while operatively coupled to a first trusted computing device, a proxy server on the first trusted computing device that uses a first trusted network for online access;
    installing, using the portable storage device while operatively coupled to a second trusted computing device, the proxy server on the second trusted computing device that uses a second trusted network for online access;
    generating one or more shared encryption keys for the first trusted computing device and the second trusted computing device on which the proxy server is installed;
    connecting, using a proxy server protocol of the portable storage device while operatively coupled to an unsecured computing device connected to an untrusted network, the unsecured computing device to a trusted device website, the trusted device website comprising a list of trusted computing devices, the list of trusted computing devices comprising at least the first trusted computing device and the second trusted computing device; and
    responsive to a selection of the first trusted computing device from the list of trusted computing devices, creating a secure connection, using the proxy server protocol of the portable storage device, between the unsecured computing device and the first trusted computing device using at least some of the one or more shared encryption keys, at least some of at least one of the installing a proxy server on the first trusted computing device, the installing the proxy server on the second trusted computing device, the generating, the connecting, or the creating implemented at least in part via a processing unit.

2. The method of claim 1, comprising generating at least one shared encryption key for the portable storage device.

3. The method of claim 1, the creating a secure connection comprising:
    encrypting data sent by the unsecured computing device to the first trusted computing device using a first shared encryption key stored within the portable storage device, the first shared encryption key corresponding to a second shared encryption key maintained on the first trusted computing device.

4. The method of claim 1, the list of trusted computing devices comprising a recommendation specifying that the first trusted computing device has a first connection speed that is faster than a second connection speed of the second trusted computing device.

5. The method of claim 1, the list of trusted computing devices comprising a recommendation specifying that the first trusted computing device has a first proximity to the unsecured computing device that is closer than a second proximity of the second trusted computing device to the unsecured computing device.

6. The method of claim 1, the list of trusted computing devices comprising a recommendation specifying that the first trusted computing device comprises at least one of a program or a file that the second trusted computing device does not comprise.

7. The method of claim 1, the unsecured computing device comprising one of:
    a laptop; or
    a tablet.

8. The method of claim 1, comprising proxying data traffic for the unsecured computing device that is using the untrusted network through the first trusted computing device that is using the first trusted network.

9. The method of claim 8, the proxying data traffic for the unsecured computing device comprising:
    proxying outbound data traffic from the unsecured computing device through the first trusted computing device to the first trusted network; and
    proxying inbound data traffic from the first trusted network through the first trusted computing device to the unsecured computing device.

10. The method of claim 8, the proxying data traffic comprising routing data traffic by proxying one or more of:
    an application layer protocol from an Internet protocol suite; or
    a transport layer protocol from the Internet protocol suite.

11. The method of claim 1, the generating one or more shared encryption keys comprising:
    generating a public/private key pair, comprising a private key and a public key, for the first trusted computing device;
    storing the private key on the first trusted computing device; and
    writing the public key to the portable storage device.

12. The method of claim 1, at least some of the one or more shared encryption keys comprising one or more of:
one or more symmetric encryption keys; or
one or more one-time password encryption keys.

13. A system for creating a secure online environment for an unsecured computing device connected to an untrusted network using a first trusted computing device connected to a trusted network, comprising:
a proxy server installer, within a portable storage device, configured to:
install, using the portable storage device while operatively coupled to a first trusted computing device, a proxy server on the first trusted computing device that uses a first trusted network for online access; and
install, using the portable storage device while operatively coupled to a second trusted computing device, the proxy server on the second trusted computing device that uses a second trusted network for online access;
an encryption key generator, within the portable storage device, configured to generate one or more shared encryption keys for the first trusted computing device and the second trusted computing device on which the proxy server is installed;
an online centralized redirector, within the portable storage device, configured to:
connect, using a proxy server protocol of the portable storage device while operatively coupled to an unsecured computing device connected to an untrusted network, the unsecured computing device to a trusted device website, the trusted device website comprising a list of trusted computing devices, the list of trusted computing devices comprising at least the first trusted computing device and the second trusted computing device; and
a secure connection generator, within the portable storage device, comprising a proxy server initiator configured to:
responsive to a selection of the first trusted computing device from the list of trusted computing devices, create a secure connection, using the proxy server protocol of the portable storage device, between the unsecured computing device and the first trusted computing device using at least some of the one or more shared encryption keys over the untrusted network, at least some of at least one of the proxy server installer, the encryption key generator, the online centralized redirector, or the secure connection generator implemented at least in part via a processing unit.

14. The system of claim 13, the list of trusted computing devices comprising a recommendation specifying that the first trusted computing device has a first connection speed that is faster than a second connection speed of the second trusted computing device.

15. The system of claim 13, the list of trusted computing devices comprising a recommendation specifying that the first trusted computing device has a first proximity to the unsecured computing device that is closer than a second proximity of the second trusted computing device to the unsecured computing device.

16. The system of claim 13, the list of trusted computing devices comprising a recommendation specifying that the first trusted computing device comprises at least one of a program or a file that the second trusted computing device does not comprise.

17. The system of claim 13, the encryption key generator configured to generate at least one shared encryption key for the portable storage device.

18. The system of claim 13, the secure connection between the unsecured computing device and the first trusted computing device configured to proxy data traffic for the unsecured computing device that is using the untrusted network through the first trusted computing device that is using the first trusted network.

19. The system of claim 13, at least some of the one or more shared encryption keys comprising one or more of:
one or more asymmetric encryption keys;
one or more symmetric encryption keys; or
one or more one-time password encryption keys.

20. A computer-readable storage device comprising computer-executable instructions, which when executed at least in part via a processing unit on a computer perform acts, comprising:
installing, using a portable storage device while operatively coupled to a first trusted computing device, a proxy server on the first trusted computing device that uses a first trusted network for online access;
installing, using the portable storage device while operatively coupled to a second trusted computing device, the proxy server on the second trusted computing device that uses a second trusted network for online access;
generating one or more shared encryption keys for the first trusted computing device and the second trusted computing device on which the proxy server is installed;
connecting, using a proxy server protocol of the portable storage device while operatively coupled to an unsecured computing device connected to an untrusted network, the unsecured computing device to a trusted device website, the trusted device website comprising a list of trusted computing devices, the list of trusted computing devices comprising at least the first trusted computing device and the second trusted computing device; and
responsive to a selection of the first trusted computing device from the list of trusted computing devices, creating a secure connection, using the proxy server protocol of the portable storage device, between the unsecured computing device and the first trusted computing device using at least some of the one or more shared encryption keys.

* * * * *